C. H. KAPLINGER.
SAFETY VALVE.
APPLICATION FILED MAY 7, 1908.
917,077.
Patented Apr. 6, 1909.
2 SHEETS—SHEET 1.
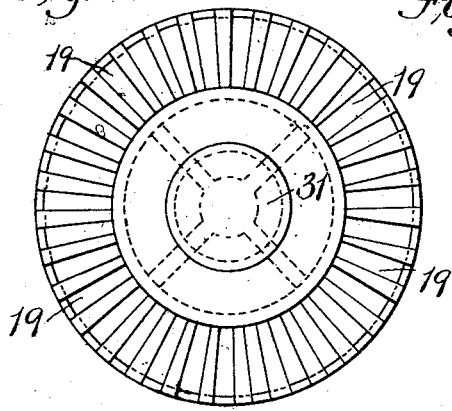
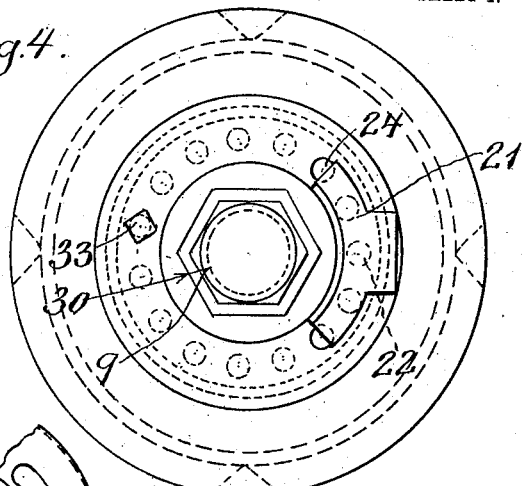
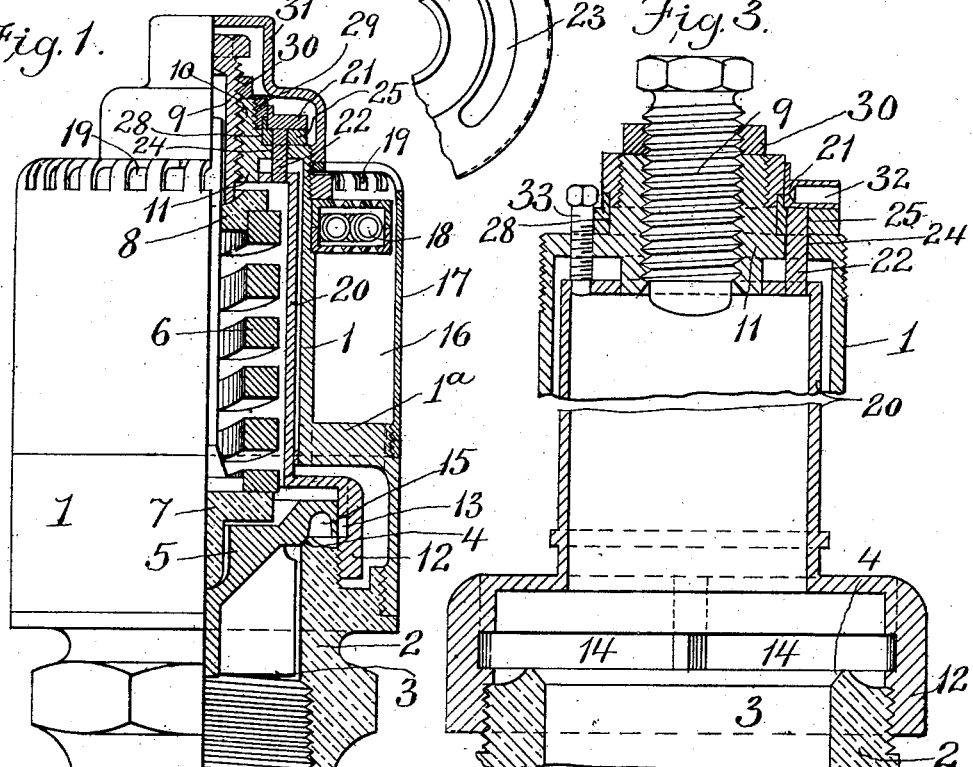
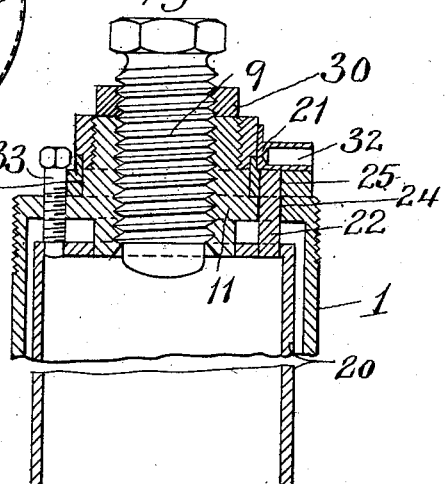
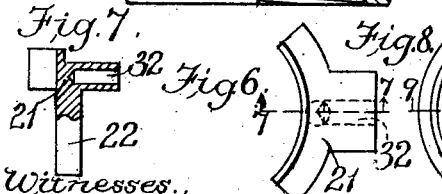
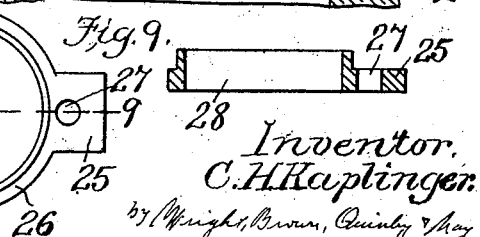
Witnesses
F. R. Roulstone.
A. C. Ratigan
Inventor.
C. H. Kaplinger.
by Wright, Brown, Quinby & May
Attys.

C. H. KAPLINGER.
SAFETY VALVE.
APPLICATION FILED MAY 7, 1908.
917,077.
Patented Apr. 6, 1909.
2 SHEETS—SHEET 2.
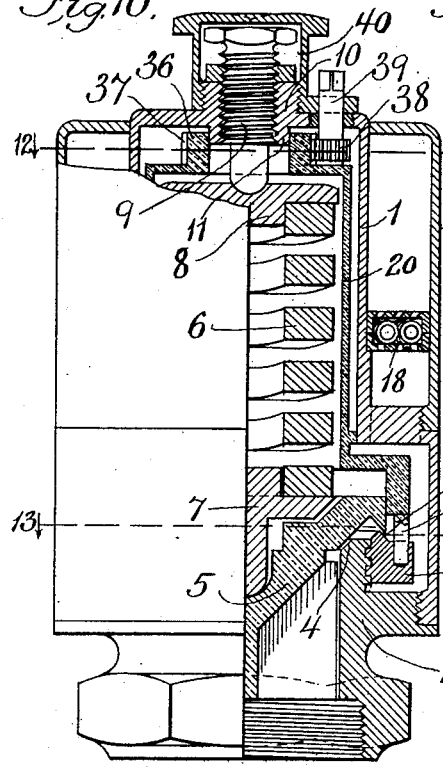
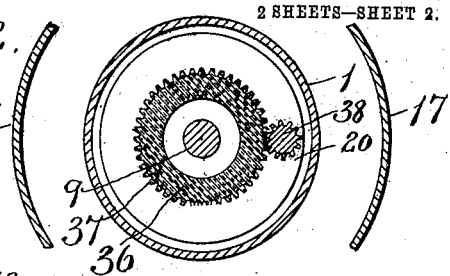
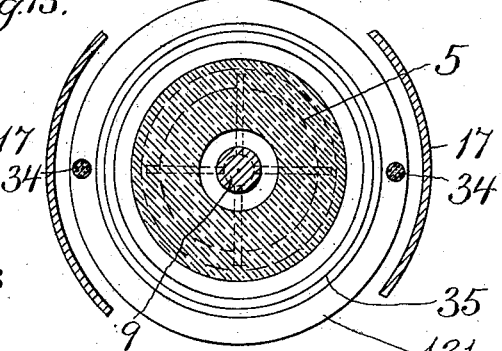
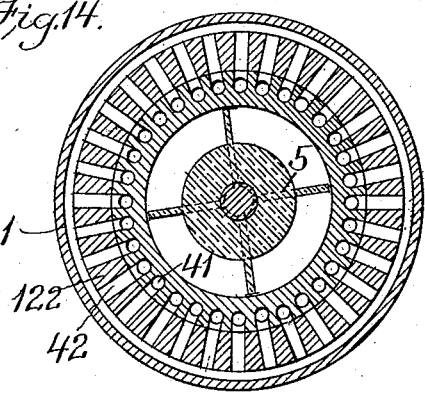
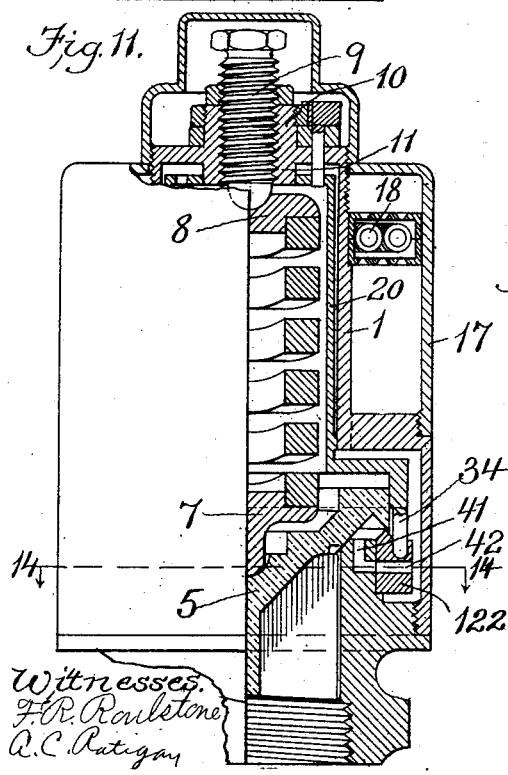
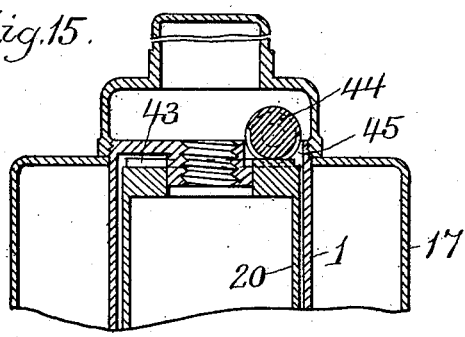
Witnesses
F. R. Roulstone
A. C. Ratigan
Inventor
C. H. Kaplinger
by Wright, Brown, Quinby & May
Attys

UNITED STATES PATENT OFFICE.

CHRISTIAN H. KAPLINGER, OF ROSLINDALE, MASSACHUSETTS, ASSIGNOR TO AMERICAN STEAM GAUGE & VALVE MANUFACTURING COMPANY, OF BOSTON, MASSACHUSETTS, A CORPORATION OF NEW JERSEY.

SAFETY-VALVE.

No. 917,077.    Specification of Letters Patent.    Patented April 6, 1909.

Application filed May 7, 1908. Serial No. 431,474.

*To all whom it may concern:*

Be it known that I, CHRISTIAN H. KAPLINGER, of Roslindale, in the county of Suffolk and State of Massachusetts, have invented certain new and useful Improvements in Safety-Valves, of which the following is a specification.

This invention relates to safety valves for steam boilers of the type known as "pop valves", and has for its main object to provide an improved means and manner of adjusting the relief ring with which such valves are ordinarily provided so as to enable the adjustment to be more quickly and easily made.

A second object is to provide a strong and rigid mounting and connection of the relief ring with the adjusting means so that the ring will not jar loose or break in the ordinary conditions of use.

Various constructions in which my invention may be embodied and various modes of use of the same are illustrated in the accompanying drawings.

Figure 1 represents a sectional elevation of a safety valve showing one embodiment of the invention. Fig. 2 represents a plan view of the same. Fig. 3 represents a sectional detail view of parts of the valve. Fig. 4 represents a plan view of the parts shown in Fig. 3. Fig. 5 represents a fragmentary plan view of part of the main casing of the safety valve. Fig. 6 represents a plan view of a form of wrench used for adjusting the relief ring in the form of valve shown in Fig. 1. Fig. 7 represents a sectional view of the same on line 7—7 of Fig. 6. Fig. 8 represents a plan view of the ring employed for relieving the friction of the wrench. Fig. 9 represents a section on line 9—9 of Fig. 8. Fig. 10 is an elevation representing another form of valve in which a different type of relief ring and different actuating element for the adjusting means are employed. Fig. 11 shows another modified form of relief ring. Figs. 12 and 13 represent fragmentary sectional views on lines 12—12 and 13—13 of Fig. 10, respectively. Fig. 14 represents a sectional view on line 14—14 of Fig. 11. Fig. 15 represents a fragmentary sectional view illustrating another form of actuating device for the adjusting means.

The same reference characters indicate the same parts in all the figures.

Referring to Figs. 1 to 9, the form of safety valve there shown comprises a main frame or casing 1, the upper portion of which may be tubular and preferably is, although it may be an open frame, and the lower part of which is enlarged and internally threaded. The threaded lower part of the casing screws upon a base 2, which in use is screwed upon the pipe leading from the boiler. This base has an internal passage 3 for the escape of steam when the pressure becomes greater than a predetermined amount. The upper part of the base is finished off as a valve seat 4. Coöperating with the valve seat is a main valve 5 which is pressed toward the seat and normally held against the same by a spring 6. This spring bears at its lower end against the piece 7 which bears upon the valve, and re-acts at its upper end against a follower 8. The latter serves as the stationary abutment for the spring, and is itself maintained by an adjustable abutment 9, which is a screw. This screw is threaded through the end of the main casing 1, which, for the purpose of giving sufficient length of engagement, is provided with external and internal bosses 10 and 11. The base 2 is threaded externally around the valve seat 4 and upon its threaded portion is screwed a relief ring 12 which has an annular space 13 surrounding the valve. This space is open through the greater part of the periphery of the relief ring, forming the outlet slots 14. An annular groove 15 is formed in the under side of the valve outside of the seating surface, and this constitutes a blow-back space, the upper surface of the base 2 and the surrounding portion of the relief ring being the boundaries of this space. When the valve is raised, its outer edge uncovers the lower part of the groove or passage 13, allowing the steam to escape into the outer casing, thence flowing through the spaces between the arms 1ᵃ of the main casing into the muffler space 16 which is inclosed by the muffler casing 17. Mufflers 18 are inclosed in this space and the steam after passing through these mufflers, escapes through the slots 19.

Within the main casing 1 is an inner member or casing 20 which may be a tube or an open frame. This inner member surrounds the spring 6 and the lower end of the adjusting screw 9, its upper end having an internal flange which fits and bears rotarily around the internal piece 11 of the main casing. The lower part of the inner casing is widened and merges into the relief ring 12, being in this form of the invention integrally united therewith. By reason of the threaded engagement of the relief ring with the valve seat, and its rigid connection with the inner casing, it will be evident that rotation of the latter will serve to turn the former and move it up and down with relation to the valve. Thus the adjacent surfaces of the valve and ring may be made to overlap or to be opened to a greater or less extent, thus regulating the outlet from the blow-back space and governing the action of the valve. By adjusting the ring, the limits within which the valve will act may be definitely fixed.

The inner casing and relief ring are adjusted by a wrench member 21 which has a pin 22 passing through a slot 23 in the end or top surface of the main casing, and adapted to enter any one of a number of holes 24 in the end flange of the inner casing. This wrench member is ordinarily kept in place and rests upon the lateral extension 25 of a ring 26 which surrounds the external boss 10, and rests upon the end of the main casing. This extension 25 has a hole 27 to receive the pin, and an annular rib 28 at its inner circumference to receive the thrust of the end portions of the wrench member. The ring 26 is retained by a nut 29 threaded upon the boss 10. These parts last described, and also the adjusting screw 9 and the lock-nut 30 for the latter are all inclosed within a cap 31 screwed upon the main casing. Whenever it is necessary to adjust the relief ring, the cap is removed and a rod or lever inserted in a hole 32 of the wrench member. This member can be turned at one swing as far as the limits of the slot 23 permit, and its pin can then be engaged with another one of the holes 24 if further rotation of the inner casing is required.

It will be noted that the main casing is not engaged or touched by either the spring 6 or the adjusting screw 9, so that no pressure is applied to it by these members, but that on the contrary, it comes no nearer to the adjusting screw than the exterior of the boss 11 with which it is loosely engaged. Thus there is no appreciable frictional resistance to the rotation of the inner casing, but it may be freely and easily turned. In this respect my invention is a material departure from other safety valves wherein the internal member is engaged by the threads of the adjusting screw and serves to hold the same. Any adjustment of the inner casing and relief ring is maintained by a lock screw 33 held in the end of the main casing, and the end of which is adapted to project into any one of the holes 24 which may be adjacent to it.

In Fig. 10, there is illustrated a valve which is the same in principle but differing in detail. In this valve the relief ring 121 is separate from the inner casing, but is engaged therewith by pins or fingers 34 on the lower end of the latter which take into holes in the ring. This ring has a rib 35 which is overlapped by the rim of the valve 5, the space between this rib and rim serving as the outlet from the blow-back space. It is in order to permit assembling of the parts that the ring in this form of the invention is made separate from the inner casing. In this form, as in the one previously described, however, there is a rigid connection of the relief ring with the valve seat and with the inner casing, so that the adjustment is positive, and it is rigidly held beyond possibility of jarring loose. A different form of adjusting means for the inner casing is also shown in this embodiment of the invention. On the end of the inner casing is a boss 36 which has spur teeth 37 with which mesh the teeth of a pinion 38 on stud 39 passing through a bearing in a bushing contained in the end of the main casing. The cap 40 which incloses the adjusting screw for the valve spring does not cover the stud 39, so that the squared end of the latter is always accessible to have applied upon it a wrench, whereby it may be turned whenever adjustment of the inner casing is necessary.

In Fig. 11 is shown another manner of adjusting the relief outlet from the blowback space. The ring 122 in this case is not threaded upon the valve seat and is therefore not vertically adjustable, but in the valve seat are a number of passages 41 which open into the blow-back space and discharge on the outer periphery of the valve seat. The relief ring has a corresponding number of passages 42 adapted to register with the passages 41, and movable so as to close the same in whole or in part. There is the same form of connection between the relief ring and inner casing as shown in Fig. 10, and when the casing is rotated, the ring is correspondingly turned, so as to open or close more or less the passages 41. The means for turning the inner casing is the same here as shown in Fig. 1.

In Fig. 15 is illustrated another mode of rotating the inner casing. In this form the upper end of the casing is provided with an annular series of radial teeth 43, and a worm 44 is contained in bearings on the end of the main frame and enters a recess 45 in the latter. Its threads engage the teeth 43, and when it is rotated, serve to turn the inner casing in the well-known manner.

I claim:—

1. A safety valve comprising a main frame, a main valve, a spring pressing said valve toward its seat, a relief ring surrounding said valve and so associated relatively thereto as by its adjustment rotatively to govern the amount of blow-back of the valve, and rotary means, within said main casing, engaged with and having the same character of rotation as said relief ring, wholly independent of and free from frictional pressure by said spring, and extending from said ring to the top of the casing, operable from above to give such rotative adjustment to the ring.

2. A safety valve comprising a main casing or frame, a main valve, a spring pressing said valve toward its seat, a relief ring surrounding the valve, means within the main casing rigidly connected with said relief ring extending from the ring to the top of the casing, and a device for engaging said means at the top and rotating it to move said ring adjustively with respect to the valve.

3. A safety valve comprising a main frame, a valve seat connected therewith, a valve, a spring arranged to press said valve toward said seat, a relief ring surrounding the valve seat and serving as one boundary of a blow-back space around the valve, an inner member contained within said main frame and engaged with said relief ring so as by its rotation to adjust the ring and thereby vary the size of outlet from the blow-back space, said member extending to the top of the main frame, and an adjusting device passing through the latter and engaged with said member for rotating it.

4. A safety valve comprising a main frame, a valve seat connected therewith, a valve, a spring arranged to press said valve toward said seat, a relief ring surrounding the valve seat and serving as one boundary of a blow-back space around the valve, an inner member contained within said main frame and engaged with said relief ring so as by its rotation to adjust the ring and thereby vary the size of outlet from the blow-back space, and an engaging element adapted to extend through the top of the main frame so as to engage said inner member and operable to rotate the same and the relief ring.

5. A safety valve comprising a main frame, a valve seat connected therewith, a valve, a spring arranged to press said valve toward said seat, an adjusting screw for said spring threaded through the main frame, a relief ring surrounding the valve seat and serving as one boundary of a blow-back space around the valve, said ring being rotatively adjustable to vary the effective outlet from the blow-back space, and an inner member surrounding said spring and adjusting screw, rotatable as a whole around the axis of said spring and screw, but out of contact with both, and engaged with the relief ring so as to effect the adjustment of the latter.

6. A safety valve comprising a main frame, a valve seat connected therewith, a valve, a spring arranged to press said valve toward said seat, an adjusting screw threaded through the end of the main frame and through an internal boss thereon, arranged to bear on and regulate the tension of said spring, a relief ring surrounding the valve seat and serving as one boundary of a blow-back space around the valve, and an inner member inclosing the spring and bearing at its upper end rotarily on said boss, said member being thereby free from friction-causing pressure, whereby it may be readily rotated, and engaging the relief ring to rotate and adjust the latter.

7. A safety valve comprising a main frame, a valve seat connected therewith, a valve, a spring arranged to press said valve toward said seat, an adjusting screw threaded through the end of the main frame and through an internal boss thereon, arranged to bear on and regulate the tension of said spring, a relief ring surrounding the valve seat and serving as one boundary of a blow-back space around the valve, an inner member inclosing the spring and rotarily surrounding said boss, said member being thereby free from friction causing pressure, whereby it may be readily rotated, and engaging the relief ring to rotate and adjust the latter, and an operating element engaged with said inner member for producing rotation thereof.

8. A safety valve comprising a main frame, a valve seat connected therewith, a valve, a spring arranged to press said valve toward said seat, a relief ring surrounding said seat and rotarily adjustable about the same to regulate the valve, an inner member having a rigid connection with said ring and extending inside of the main frame toward the top thereof, and a wrench member passing through a slot in the top of the main frame and entering one of a series of recesses in the inner member for effecting rotation thereof.

9. A safety valve comprising a main frame, a valve seat connected therewith, a valve, a spring arranged to press said valve toward said seat, an external boss on the upper end of said main frame, an adjusting screw threaded through said boss and arranged to bear on and adjust the tension of said spring, a relief ring surrounding said seat and rotarily adjustable about the same to regulate the valve, an inner member having a rigid connection with said ring and extending inside of the main frame toward the top thereof, a ring surrounding the boss and rotatable thereabout, said ring having an extension with a perforation through it, and a wrench member having a pin passing through said perforation, also passing through a slot in the top of the main frame and entering one of a series of recesses in the inner member for effecting rotation thereof, said wrench having curved extensions arranged to bear on a rib rising from said ring, which takes the thrust of the wrench.

10. In a safety valve having a main casing, a muffler casing, a main valve, valve seat, valve spring and relief ring, an inner casing within said main casing surrounding said spring engaged with said relief ring and rotatable to adjust the same, said inner casing being clear of the spring and not pressed upon thereby.

11. In a safety valve having a main casing, a muffler casing, a main valve, valve seat, valve spring and relief ring, an inner casing within said main casing inclosing said spring engaged with said relief ring and rotatable to adjust the same, and an abutment for the spring independent of and out of engagement with said casing, whereby the latter is permitted to turn without excessive frictional resistance.

In testimony whereof I have affixed my signature, in presence of two witnesses.

CHRISTIAN H. KAPLINGER.

Witnesses:
   ARTHUR H. BROWN,
   P. W. PEZZETTE.